United States Patent [19]

Allen

[11] 4,425,971
[45] Jan. 17, 1984

[54] FOLDING AGRICULTURAL IMPLEMENT
[75] Inventor: Lyal D. Allen, Mannum, Australia
[73] Assignee: Horwood Bagshaw Limited, Edwardstown, Australia
[21] Appl. No.: 320,607
[22] Filed: Nov. 12, 1981
[30] Foreign Application Priority Data Nov. 18, 1980 [AU] Australia .............................. PE6529

[51] Int. Cl.³ .......................................... A01B 73/00
[52] U.S. Cl. ................................... 172/311; 172/328; 172/662; 172/776; 172/413
[58] Field of Search ................... 56/228, 385; 172/311, 172/328, 396, 413, 456, 662, 776, 327, 310, 316; 280/43.23

[56]        References Cited
       U.S. PATENT DOCUMENTS 3,534,819 10/1970 Grover .................................. 172/316
3,536,144 10/1970 Hood et al. ...................... 172/456 X
3,666,284  5/1972 Hunter et al. .................. 172/413 X
3,774,694 11/1973 Gates ............................... 172/776 X
4,308,920  1/1982 Floyd et al. ......................... 172/328
4,316,511  2/1982 Andersen ............................ 172/776

FOREIGN PATENT DOCUMENTS 69539 of 1941 Czechoslovakia ................. 172/776

Primary Examiner—Richard T. Stouffer
Assistant Examiner—W. Honaker
Attorney, Agent, or Firm—Pearne, Gordon, Sessions, McCoy, Granger & Tilberry

[57]            ABSTRACT

A folding implement frame is disclosed which has wheels placed amid the tools on the frame so that variations in ground level will not alter cultivation depth. A novel method of folding is described which will enable the wheels to be used for transport. A linkage system is provided to maintain the frames horizontal position during raising and lowering.

10 Claims, 6 Drawing Figures

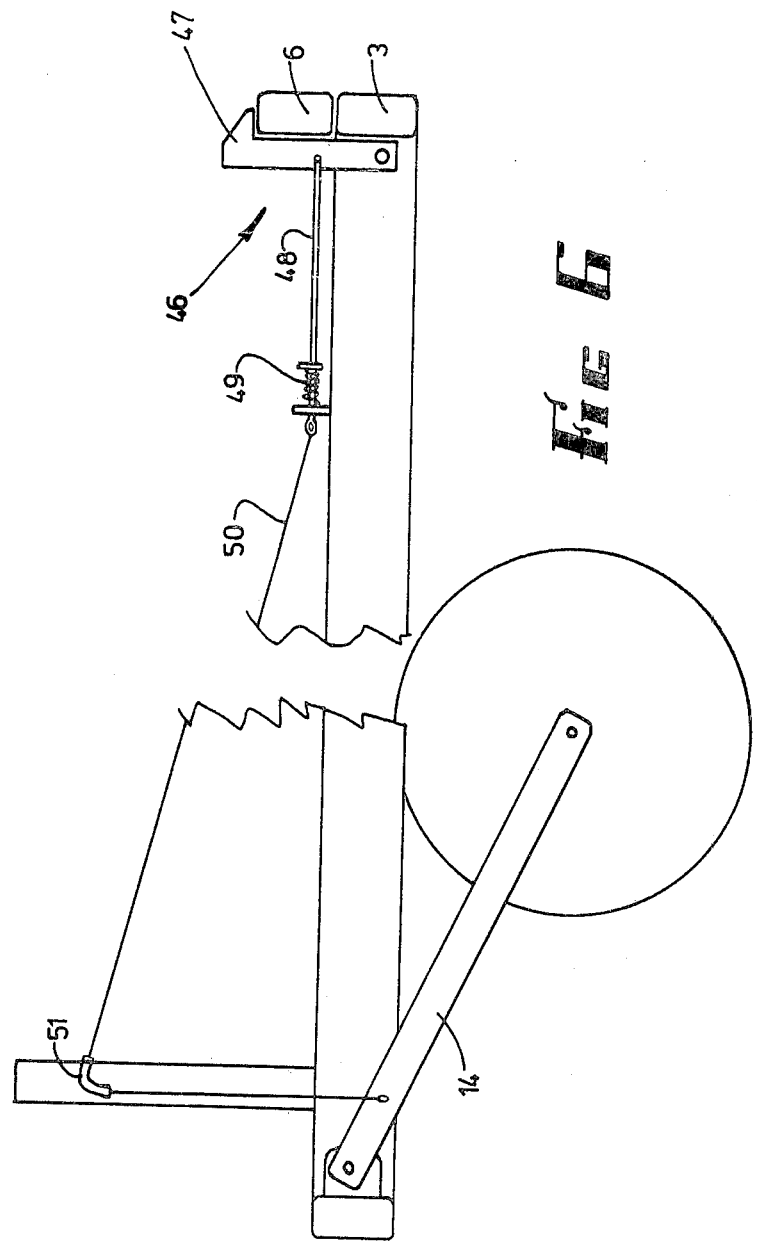

FOLDING AGRICULTURAL IMPLEMENT

This invention relates to agricultural implements and more particularly to agricultural implements that may be folded to make transport simpler.

It is well known to provide agricultural implements which will fold from a working position where they extend over a considerable width to a transport position where the sides in one way or another fold into the centre so that the width may be reduced for travelling on roads and the like.

The types of agricultural ground working tools that may be placed on folding implement franes include harrows, seed drills, cultivators, scarifiers, chisel ploughs and blade ploughs. With these implements it is most important that good height control is achieved so that constant even cultivation depth is achieved throughout the length and width of the implement. Previous types of folding implements have had ground supporting wheels ahead of the cultivating frames and height adjustments means acting upon these wheels have enabled the height of the implement frame relative to the ground to be varied to enable different depths of cultivation.

With height control only at the front of an implement frame as is conventionally done, varying the height of the front of the frame will cause the height of the back of the frame to vary by a greater amount and hence uneven cultivation depth will occur.

This may be solved by the use of tools spaced closely together so that they are not too far away from the point of action of the ground supporting wheels. It is important however that a large spacing be used between rows of cultivating implements on an implement frame so that good trash clearance is achieved while at the same time ensuring that all the ground covered by the implements gets cultivated. There is therefore a double problem to have the tools sufficiently spaced to enable good trash clearance while at the same time having all the implements in each row digging to a known and controllable depth.

Another problem with supporting implement frame with wheels placed well away from the ground working tools such as having wheels forward of the implements frames is that when the wheels pass over undulations in the ground then there is a large variation in change in height between the front and rear of the implement frame.

It is one object therefore of this invention to provide an implement frame in which appreciable variation in cultivation depth will not occur from the front to the back of the implement.

It is a further object of the invention to provide a novel method of folding an implement frame such that the problems discussed above are overcome but the folding implement frame may still be folded easily and efficiently to a transport position.

There is the further problem however that if wheels are placed amidst the tools on the implement frame then when the frame is folded for transport the wheels will no longer be able to act to support the implement.

It is a further object of this invention therefore to provide a means of having the ground engaging wheels of an implement frame amidst the tools on the implement while still being able to use the ground engaging wheels when the implement is folded for transport.

In one form therefore the invention is said to reside in a folding implement of a type having a draft frame, a central implement frame, and two side implement frames, one each located to each side of the central implement frame, the folding implement being characterised according to this invention in that ground engaging wheels are supported by and positioned amid the respective implement frame and height control means between the respective implement and the wheels are adapted and supported to enable the height of the implement frames to be varied with respect to the ground, and folding means to enable folding the implement into a transport position.

In a further form the invention is said to reside in a folding implement of the type having a draft frame, a central implement frame, and two side implement frames, one each located to each side of the central implement frame, the folding implement being characterised according to this invention by a lift frame pivotally connected to the central implement frame so as to be rotatable about a generally transverse and horizontal axis, each side implement frame being a pivotally connected one to each side of the lift frame, the implement being constructed so that in an operating position the lift frame will overlie at least part of the central implement frame and in a transport position the lift frame is rotated to be in a substantially vertical position and the side implement frames are in a folded location rotated about a now substantially vertical axis to reduce the width of the implement for transport.

In a preferred embodiment of the invention the height control means includes trailing wheel arms and hydraulic actuators for each respective wheel arm. In an alternative embodiment there are provided two wheel arms for the central implement frame and one each wheel arm for the side implement frames. The hydraulic system for such wheel arms may comprise a system in which the hydraulic actuators for the wheel arms are connected in series such that displaced hydraulic fluid from the actuators on the central implement frame actuate the actuators on the respective side implement frames.

There may also be provided between the central implement frame and the lift frame a scissors linkage which is folded when the lift frame overlies the central implement frame but is extended so as to assist with supporting the weight of the lift frame when the folding implement is in the transport position.

There may also be provided a link means between the lift frame and the central implement frame so that when the folding implement is in the operating position the lift frame and the central implement frame are fixed to prevent relative motion but that the link means is automatically disconnected during actuation of the height control means.

In one preferred embodiment the folding implement may include a linkage system between the draft frame and the central implement frame such that as the implement frame is raised or lowered the central implement frame remains substantially parallel to the ground.

This linkage system may include links from the draft frame and the central implement frame interconnected with an actuating rod associated with the height control means.

The generally transversent horizontal axis upon which the lift frame pivots on the central implement frame may be positioned along the leading edge of the central implement frame.

It will be seen that by the above there may be provided an implement frame which can be varied in height from a working position yet placed in a convenient folded position with a much reduced width for transport compared to previous implements which have had wheels placed amid the ground engaging tools.

The actual process of folding an implement according to this invention may be as follows. First each implement frame is raised from the ground by means of the height control means between the ground engaging wheels and the frame until the tools on each frame are substantially clear of the ground. Next the two side implement frames and the central lift frame are rotated together about an axis substantially transversent to the draft direction of the implement until the lift frame and the two side implement frames are substantially vertical and then third the side implement frames are rotated about a now vertical axis so that the width of the implement is substantially reduced for transport.

An embodiment of this invention will now be described with reference to and as illustrated by the accompanying drawing in which:

FIG. 6 shows a view of the link means to lock the lift frame to the central implement frame.

Figure 1:
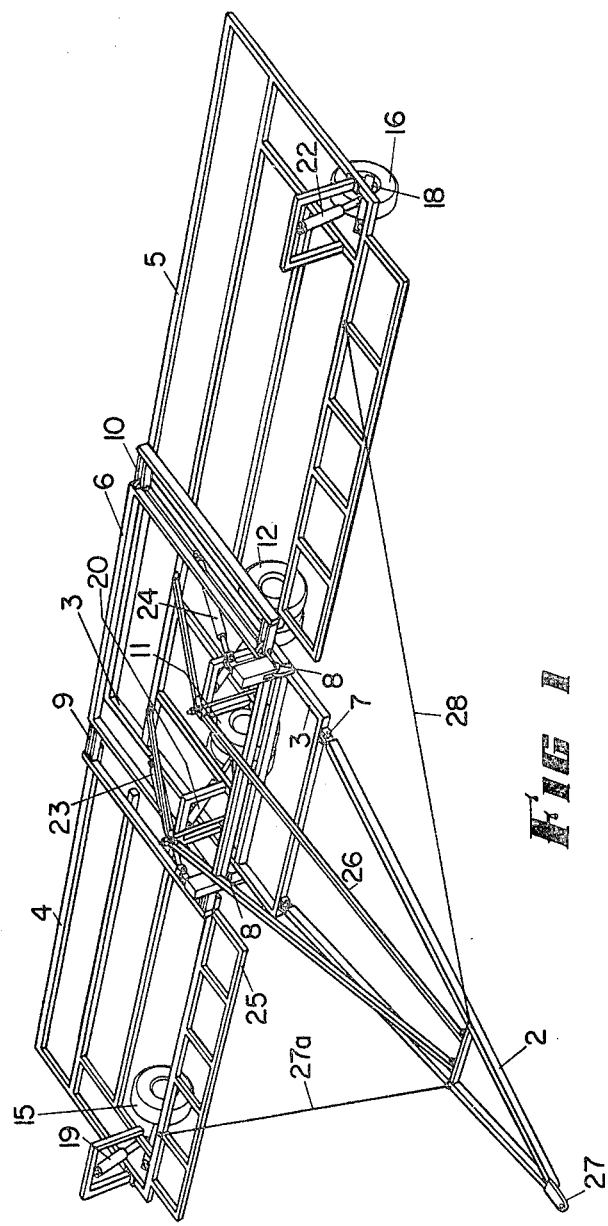
FIG. 1 shows the implement in a working position.
Figure 2:
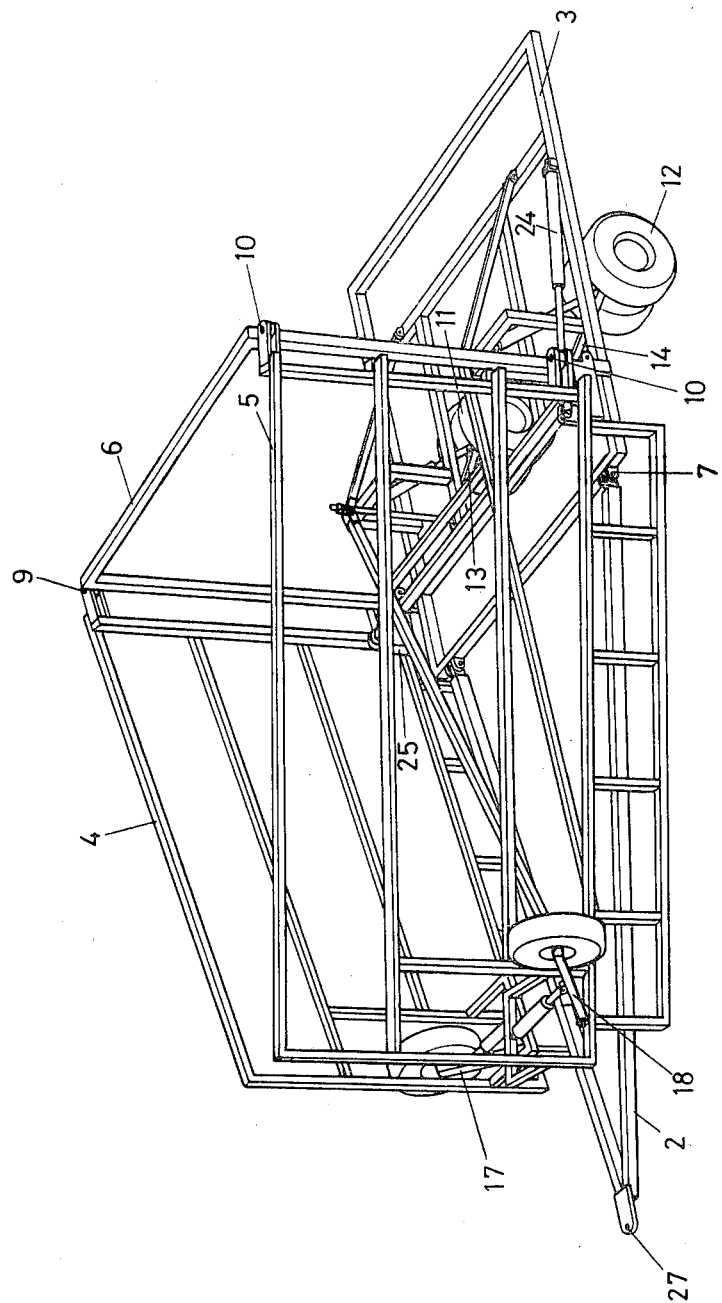
FIG. 2 shows the implement in a folded condition.

Now looking at FIGS. 1 and 2, the folding implement comprises a draft frame 2, a central implement frame 3 and side implement frames 4 and 5.

The side implement frames 4 and 5 are connected to a lift frame 6 which in the working condition overlies the central implement frame 3. A pivot 7 is provided between the draft frame 2 and the central implement frame 3. A further pivot point 8 is provided between the central implement frame and the lift frame.

The side implement frames 4 and 5 are pivoted to the lift frame by means of pivot points 9 and 10. The implement frame is ground supported by means of ground engaging wheels 11 and 12 pivoted on wheel arms 13 and 14 respectively on the central implement frame and the side implement frames are supported by wheels 15 and 16 on the side implement frames 4 and 5 and supported on trailing arms 17 and 18.

Hydraulic actuators 19, 20, 21 and 22 act on wheel arms 17, 13, 14, and 18 respectively and are attached to the respective implement frames. The actual arrangement of the hydraulic lines will be discussed in relation to FIG. 5 later. The lift frame 6 is rotated about the axis point 8 by means of hydraulic actuators 23 and 24 which are connected between the central implement frame 3 and arms 25 extending from the lift frame.

A parallel linkage system is shown generally as 26 connects between the draft frame 2 and the central implement frame 3. This will be discussed in more detail in relation to FIGS. 3 and 4.

In use the folded implement shown in FIG. 2 is towed by means of draft linkage 27 to where it is desired to be used and then the side implement frames 4 and 5 are swung outwardly while the lift frame is maintained in the vertical position until they are substantially co-planar with the lift frame 6. Next the hydraulic actuators 23 and 24 are operated to lower the lift frame until it is overlying the central implement frame 3 at the same time the side implement frames 4 and 5 rotate backwards to be substantially parallel with the ground.

Finally the hydraulic actuators 19, 20, 21 and 22 are simultaneously operated to lower the whole implement into a position where tools on the frames not shown in these illustrations engage the ground for ground working operations. While the implement is being lowered the parallel linkage system 26 comes into operation to ensure that the implement frames remains substantially parallel with the ground.

Cables 27a and 28 extending from the forward end of the draft frame to the ends of the side implement frames may be provided to reduce the stress on the folding implement during folding operations and while the implement is in the working condition and being operated.

Now looking more closely to FIGS. 3 and 4 the parallel linkage system 26 will be described in more detail. In these drawings the lift frame and the respective hydraulic actuators and other details are omitted to more clearly show the operating features of this facet of the invention.

Figure 3:
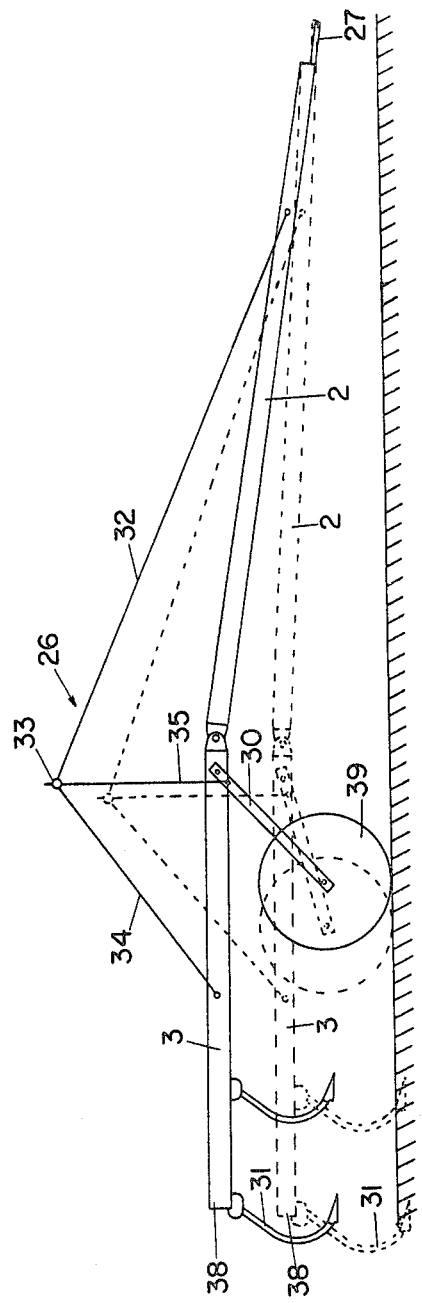
FIG. 3 is a schematic drawing of the working of the height control means and the parallel linkage system.
Figure 4:
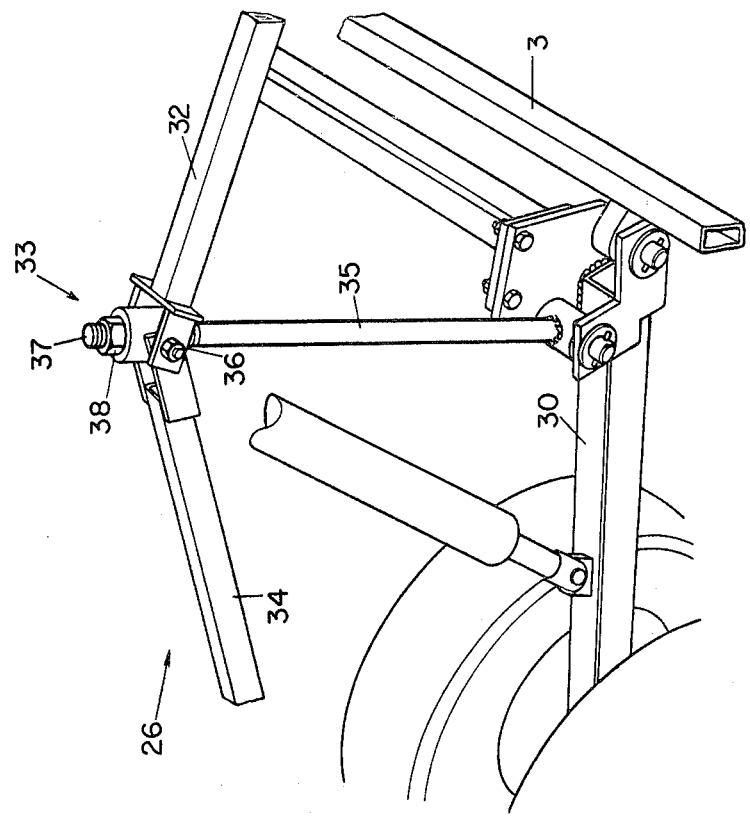
FIG. 4 shows the linkage between a central wheel arm and the parallel linkage system and FIG. 5 shows a schematic view of the hydraulic system of a folding implement of the present invention.

In the transport position as shown by the complete lines in FIG. 3 the draft linkage 27 remains substantially at a constant height from the ground as it is normally connected to a draft implement of some kind and the wheel arm 30 is lowered to ensure that implements or ground working tools 31 on the frame 3 are well clear of the ground.

Only some of the implements 31 are shown.

The parallel linkage system 26 consists of a forward link 32 extending from the forward end of the draft frame 2 to a connection point 33 and a rear linkage 34 extending back to mid-way along the draft frame 3. An actuating rod 35 extends from the wheel arm up to the connection point 33. As can be seen in FIG. 4 the connection point 33 between the forward link 32 and the rearward link 34 and the actuation rod 35 consists of a substantially horizontal transverse pivot axis 36 upon which the forward link 32 and the rearward link 34 are pivoted and extending through that pivot axis is the actuating rod 35 which is provided with a screw threaded portion 37 and adjusting nuts 38 so that the actual position of the connecting point on the actuating rod 35 maybe varied.

It will be seen that as the height of the connection point 33 on the actuating rod 35 is raised then provided the draft linkage 27 remains constant then the rear of the implement 38 must rise and conversely as the point 33 is lowered then the rear of the implement will fall. By this means the central implement frame may be made parallel to the ground by moving the connection 33.

When it is desired to place the implement into the ground working position shown by the dotted lines in FIG. 3, the wheel arm 30 is raised so in fact the central implement frame comes lower to the ground. As the wheel arm is raised the actuating rod 35 is raised by a small amount which once again providing the draft point 27 remains substantially constant will stop the rear of the implement 38 lowering quite as far as would be expected had the parallel linkage system not been present. By a careful selection of the lengths of the links 32 and 34 and the positioning of the connection point 33 the central implement frame and hence the frames connected to that, the lift frame, and the side implement frames will be caused to remain substantially parallel with the ground whether in the raised or lowered condition.

It will be seen that the position of the wheel 39 is substantially amid the tools 31 and hence any variation in height met by the wheel will be met by the tools 31 at approximately the same time. This will ensure that an even cultivation depth is obtained.

Figure 5:
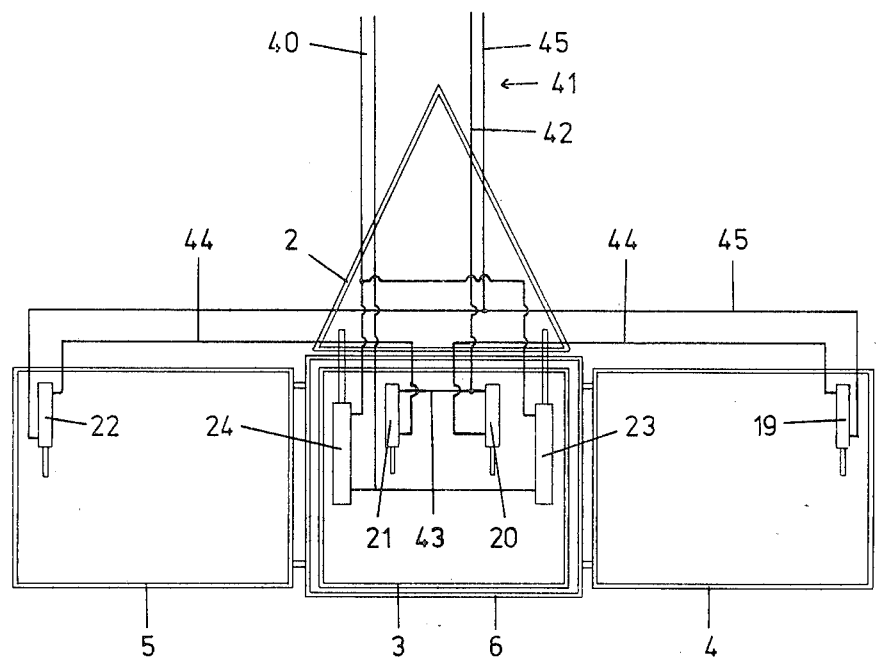

Now looking at FIG. 5, it will be seen that two separate hydraulic systems are used. A first system commencing with hydraulic lines 40 is used for raising and lowering the lift frame and operates onto hydraulic cylinders 23 and 24.

A separate hydraulic system 41 actuates the wheel arms. In this system to lower the wheel arms, that is to retract the hydraulic actuators hydraulic fluid is fed into line 42 which feeds into a forward end of hydraulic cylinders 21 and 20 through fluid line 43 which forces fluid out of the rear of the hydraulic cylinders 21 and 20 through fluid line 44 into the front of hydraulic cylinders 19 and 22. Fluid from the back of hydraulic cylinders 19 and 22 is fed through line 45 back to the source of hydraulic fluid. It will be seen that by this means sufficient hydraulic fluid in line 42 is only required to actuate two of the wheel arms which automatically actuates the fluid in the other two wheel arms ensuring constant raising and lowering of the implement over the full width of the implement.

When it is desired to raise the implement the fluid flow is reverse of that discussed above.

FIG. 6 shows how the link system 46 between the central implement frame 3 and the lift frame 6 may operate.

The link system 46 comprises a hooked link 47 which is mounted on the central implement frame 3 and hooked over the lift frame 6.

A spring loaded rod 48 has a compression spring 49 which biases the hooked link 47 to hook onto the lift frame 6.

A cable 50 extends from the rod 48 over a guide 51 down to a wheel arm 14.

As the wheels are lowered to raise the frame 3 the cable 51 is pulled which withdraws the rod 48 against the spring 49 and hence releases the hooked link 47. The lift frame 6 may then be raised.

It will be seen that in this embodiment there is provided a folding implement frame which may be folded considerably for transport yet at the same time have good height control and a broad cultivation width.

The claims defining the invention are as follows.

I claim:

1. A folding implement of a type having a draft frame and a central implement frame and two side implement frames, one each located to each side of the central implement frame, said implement frames being adapted to have ground working tools mounted thereto, the folding implement being characterised according to this invention in that ground engaging wheels are supported by and positioned amid the respective implement frames, and height control means between the respective implement frames and the wheels are adapted and supported to enable the height of the implement frame to be varied with respect to the ground, and folding means to enable folding the implement into a transport position, said folding means including a lift frame pivotally connected to the central implement frame so as to be rotatable about a generally transverse and horizontal axis, said lift frame being free of ground working tools, each side implement frame being pivotally connected to a side of the lift frame, the implement being constructed so that in an operating position the lift frame will overlie at least part of the central implement frame and in the transport position the lift frame is rotated to be in a substantially vertical position and the side implement frames are in a folded location rotated about a now substantially vertical axis to reduce the width of the implement for transport.

2. A folding implement as in claim 1 further characterised in that the draft frame is pivotally connected to the central implement frame.

3. A folding implement as in claim 1 or 2 further including a linkage system between the draft frame and the central implement frame such that as the implement frame is raised or lowered the central implement frame remains substantially parallel to the ground.

4. A folding implement as in claim 3 wherein the linkage system includes links from the draft frame and the central implement frame, interconnected with an actuating rod associated with the height control means.

5. A folding implement frame as in claim 1 or claim 2 wherein the height control means includes trailing wheel arms and hydraulic actuators for each respective wheel arm.

6. A folding implement as in claim 5 wherein two wheel arms are used for the central implement frame and one each wheel arm for the side implement frames.

7. A folding implement frame as in claim 6 wherein the hydraulic system for the hydraulic actuators for the wheel arms is connected in series such that displaced hydraulic fluid from the actuators on the central implement frame actuate the actuators on the respective side implement frames.

8. A folding implement frame as in claim 5 wherein a link means connects the lift frame to the central implement frame in the operating position but that the lift means is automatically disconnected during actuation of the height control means.

9. A folding implement of the type having a draft frame, a central implement frame and two side implement frames, one each located to each side of the central implement frame, said implement frames being adapted to have ground working tools mounted thereto, the folding implement being characterised according to this invention by a lift frame pivotally connected to the central implement frame so as to be rotatable about a generally transverse and horizontal axis, said lift frame being free of ground working tools, each side implement frame being pivotally connected one to each side of the lift frame, the implement being constructed so that in an operating position the lift frame will overlie at least part of the central implement frame and in a transport position the lift frame is rotated to be in a substantially vertical position and the side implement frames are in a folded location rotated about a now substantially vertical axis to reduce the width of the implement for transport.

10. A folding implement as in claim 9 wherein the generally transverse and horizontal axis upon which the lift frame is pivoted is positioned along the leading edge of the central implement frame.

* * * * *